United States Patent
Fang et al.

(10) Patent No.: US 12,456,563 B2
(45) Date of Patent: Oct. 28, 2025

(54) HOUSING FOR AN ELECTRICAL PASS-THROUGH

(71) Applicant: Lear Corporation, Southfield, MI (US)

(72) Inventors: Chao Fang, Shanghai (CN); Jianwei Guo, Shanghai (CN); Jiayun Chen, Shanghai (CN)

(73) Assignee: Lear Corporation, Southfield, MI (US)

( * ) Notice: Subject to any disclaimer, the term of this patent is extended or adjusted under 35 U.S.C. 154(b) by 157 days.

(21) Appl. No.: 18/367,156

(22) Filed: Sep. 12, 2023

(65) Prior Publication Data
US 2024/0087775 A1   Mar. 14, 2024

(30) Foreign Application Priority Data

Sep. 13, 2022   (CN) .......................... 202211109085.8

(51) Int. Cl.
*H01B 17/00* (2006.01)
*H01B 17/26* (2006.01)

(52) U.S. Cl.
CPC .................................. *H01B 17/265* (2013.01)

(58) Field of Classification Search
CPC .................................................... H01B 17/265
See application file for complete search history.

(56) References Cited

U.S. PATENT DOCUMENTS

| | | | |
|---|---|---|---|
| 8,109,789 B2 | 2/2012 | Tyler | |
| 9,397,436 B2* | 7/2016 | Engström | H01R 13/42 |
| 10,573,988 B2 | 2/2020 | Mellott et al. | |
| 10,897,099 B2 | 1/2021 | Mellott et al. | |
| 10,969,037 B2 | 4/2021 | Vaughn et al. | |
| 2011/0018210 A1* | 1/2011 | Beele | F16L 5/10 |
| | | | 277/606 |
| 2015/0357806 A1* | 12/2015 | Korcz | H02G 15/16 |
| | | | 174/541 |
| 2019/0157776 A1 | 5/2019 | Castillo et al. | |
| 2020/0144771 A1 | 5/2020 | Zhang | |

FOREIGN PATENT DOCUMENTS

| | | |
|---|---|---|
| EP | 3477789 A1 | 5/2019 |
| EP | 3849025 A1 | 7/2021 |

* cited by examiner

*Primary Examiner* — Pete T Lee
(74) *Attorney, Agent, or Firm* — MacMillan, Sobanski & Todd, LLC

(57) ABSTRACT

A electrical pass-through includes a housing and a cap assembly. The housing has a cap lock and a cable opening that extends through the housing and that defines a cable axis. The cable opening has a non-circular cross-sectional shape when viewed perpendicularly relative to the cable axis. The cap assembly has a cap base and a cap catch. A cap opening extends through the cap base and the cable axis extends through the cap opening. The cap assembly movable relative to the housing to a locked position wherein the cap catch engages the cap lock to retain the cap assembly in the locked position relative to the housing.

11 Claims, 13 Drawing Sheets

HOUSING FOR AN ELECTRICAL PASS-THROUGH

BACKGROUND OF THE INVENTION

This invention relates to electrical pass-throughs. More specifically, this invention relates to an improved structure for a housing for such an electrical pass-through.

Electrical components are often connected to each other using conductive wires. When the electrical components are separated from each other by a wall or other barrier, it may be desirable to use a pass-through to allow the wire to extend through the barrier safely and securely. An example of an electrical pass-through is described in U.S. Pat. No. 11,114,804. The electrical pass-through includes a housing that is attached to the barrier. It would be desirable to provide an improved housing for the electrical pass-through.

SUMMARY OF THE INVENTION

This invention relates to an electrical pass-through. The electrical pass-through includes a housing. The housing has a cap lock. The housing also has a cable opening that extends through the housing and that defines a cable axis. The cable opening has a non-circular cross-sectional shape when viewed perpendicularly relative to the cable axis. The electrical pass-through also includes a cap assembly. The cap assembly has a cap catch. The cap assembly also has a cap base. A cap opening that extends through the cap base and the cable axis extends through the cap opening. The cap assembly movable relative to the housing to a locked position wherein the cap catch engages the cap lock to retain the cap assembly in the locked position relative to the housing.

In another embodiment of the invention, the cap assembly includes a cap portion and a claw portion. The cap portion has a plurality of lock surfaces that are angled relative to the cable axis such that as the distance from the claw portion increases, the distance between the lock surface and the cable axis decreases. The claw portion has a claw body with a claw opening that the cable axis extends through. The claw portion also has fingers that extend from the claw body towards the cap portion. The cap portion is movable relative to the claw portion. The cap portion may be in an initial position wherein the cap portion is separate from the claw portion. The cap portion may be in a locked position wherein each of the fingers engages one of the lock surfaces and is deflected toward the cable axis and wherein the cap lock engages the cap catch to retain the cap portion in position relative to the housing.

In another embodiment of the invention, the electrical pass-through includes an electrical cable that defines a cable axis. The cable has an outer radius. The housing includes an inner wall that defines the cable opening. Further, the distance between the cable axis and different locations on the inner wall includes a longer distance that is greater than the cable radius, and a shorter distance that is less than the cable radius.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
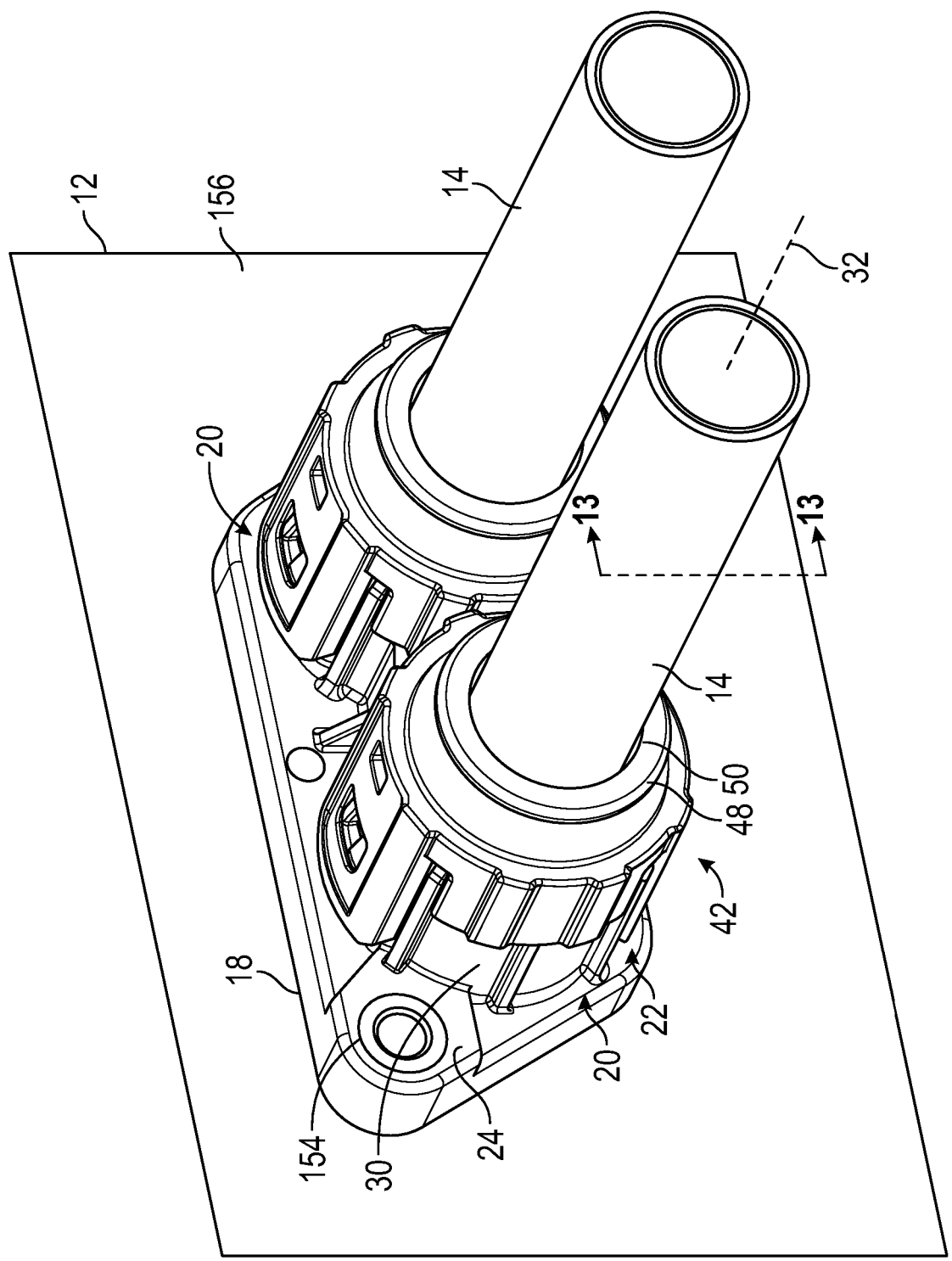
FIG. 1 is a front perspective view of an electrical pass-through in accordance with this invention shown supported on a panel of an enclosure.
Figure 2:
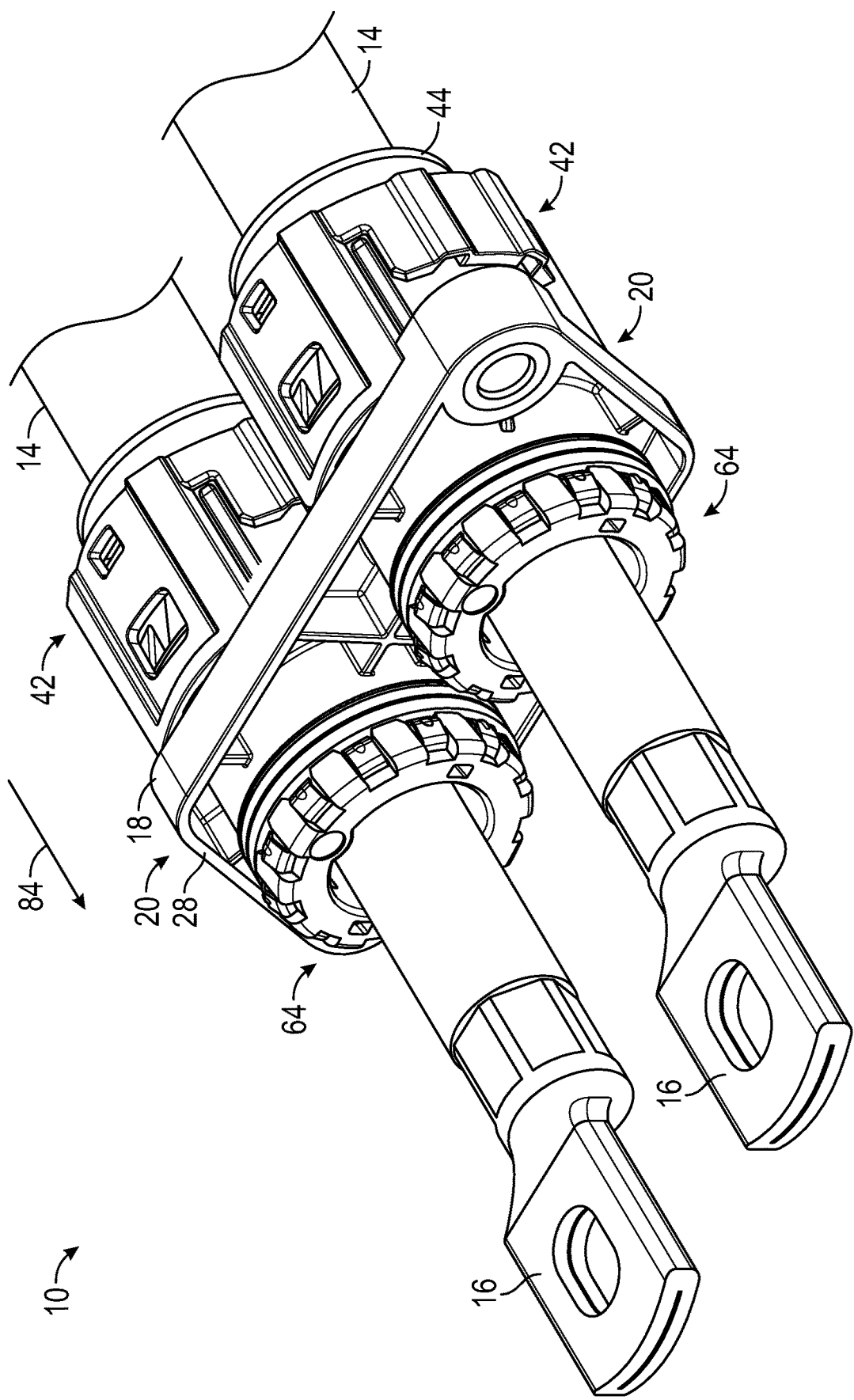
FIG. 2 is a rear perspective view of the electrical pass-through illustrated in FIG. 1, wherein the panel has been omitted for clarity.

Referring now to the drawings there is illustrated in FIG. 1 an electrical pass-through, indicated generally at 10, in accordance with this invention. The electrical pass-through 10 may, for example, be positioned adjacent to and supported on a panel 12 of an enclosure in a manner that is well known in the art. The electrical pass-through one or more 10 is adapted to allow objects, such as the illustrated pair of electrical cables 14, to extend through the panel 12, while limiting movement of the cables 14 relative to the panel 12. FIG. 2 is a rear perspective view of the electrical pass-through illustrated in FIG. 1, wherein the panel has been omitted for clarity.

The illustrated electrical cables 14 may be connected to a respective electrical terminal 16. In the illustrated embodiment, there are two cables 14, and each of such cables 14 has approximately the same outer diameter. However, the electrical pass-through 10 of this invention may allow any desired number of cables 14, having any desired relative dimensions, to extend through the panel 12.

Figure 3:
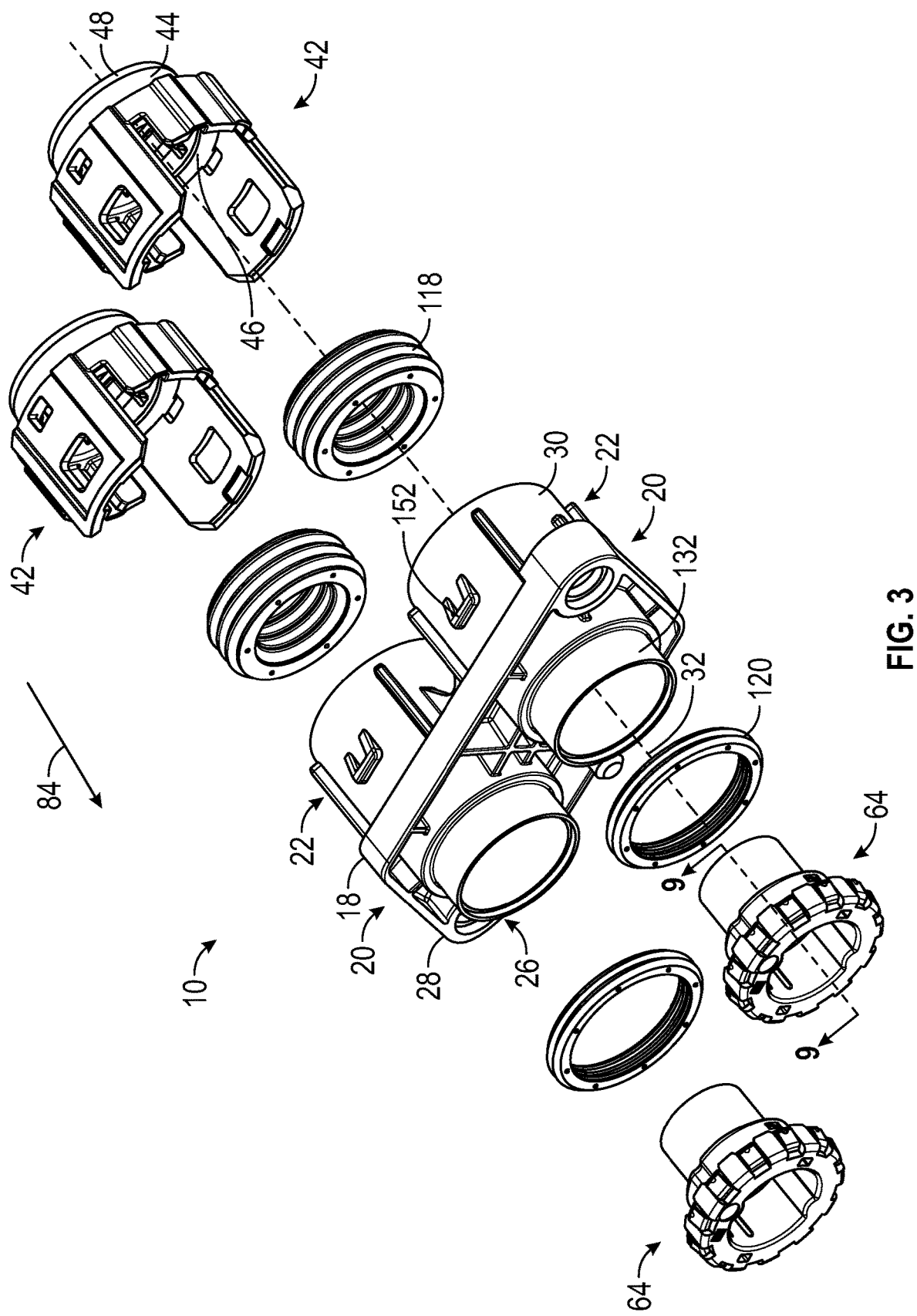
FIG. 3 is an exploded rear perspective view of the electrical pass-through illustrated in FIGS. 1 and 2, wherein cables and terminals have been omitted for clarity.

FIG. 3 is an exploded rear perspective view of the electrical pass-through 10 illustrated in FIGS. 1 and 2, wherein the cables 14 and terminals 16 have been omitted for clarity. The electrical pass-through 10 includes a housing 18 that is molded from a plastic material but may be made from any desired material using any desired process. The illustrated housing 18 includes a pair of cable supports, each indicated generally at 20. Preferably, a cable support 20 is provided for each of the illustrated electrical cables 14. However, any desired number of such cable supports 20 may be provided. The illustrated cable supports 20 have similar features, although again such is not required.

Each of the cable supports 20 includes a cap support, indicated generally at 22, that is located on a first side 24 of the housing 18. Each of the cable supports 20 also includes a contact support, indicated generally at 26, that is located on a second side 28 of the housing 18. Each of the cable supports 20 further includes a shroud 30 that is aligned with a cable axis 32 defined by the housing 18, although such is not required. Each of the illustrated shrouds 30 has a circular cross-sectional shape when viewed perpendicularly relative to the cable axis 32, but the shrouds 30 may have any desired shape or combination of shapes.

Figure 4:
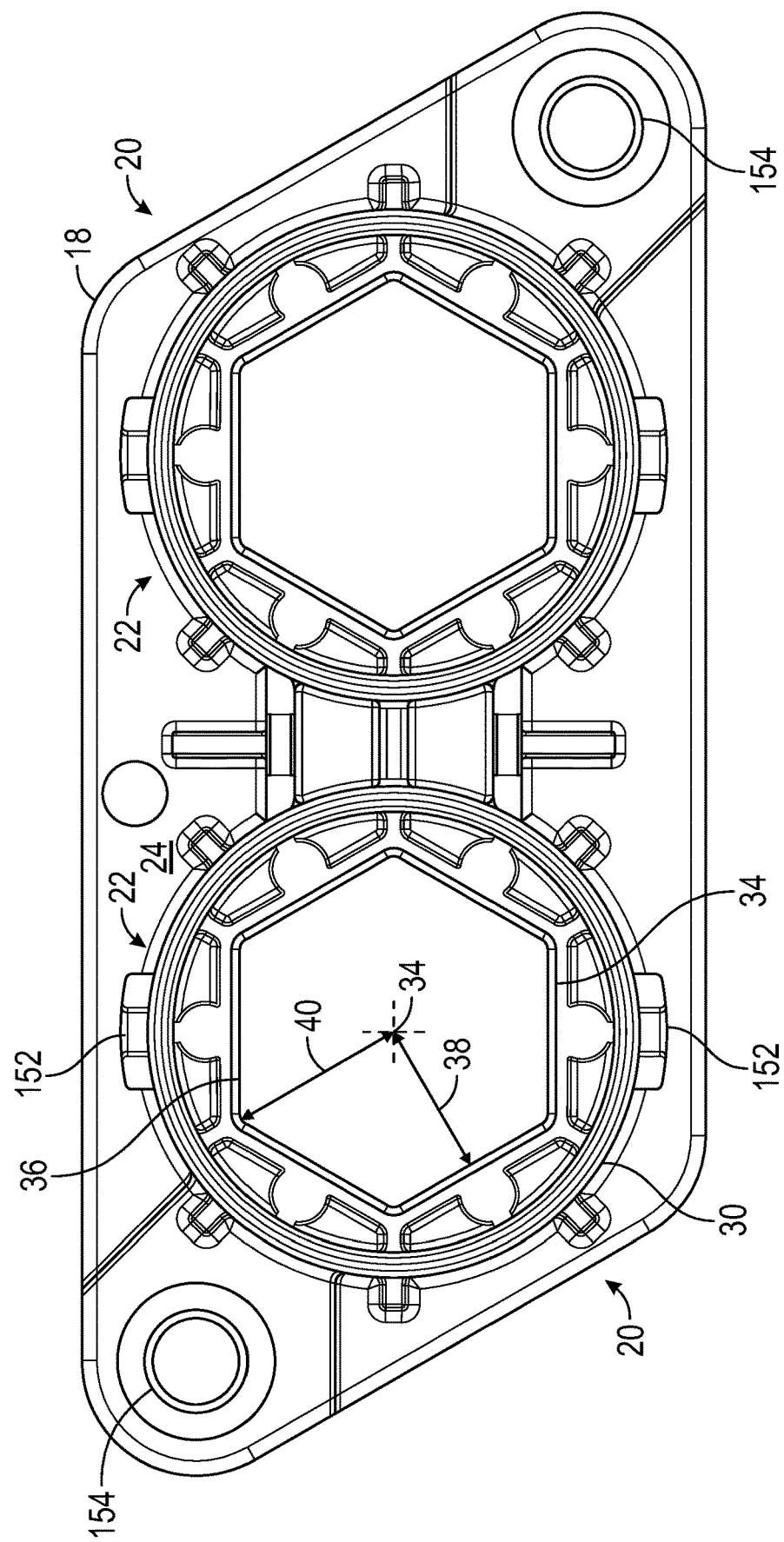
FIG. 4 is an enlarged end elevational view of a cable support of a housing of the electrical pass-through illustrated in FIGS. 1 through 3.

As shown in FIG. 4, each of the shrouds 30 is located around an associated cable opening 34 that extends through the housing 18. Each of the cable openings 34 is adapted to allow one of the cables 14 to pass through the housing 18 from the first side 24 to the second side 28. Each of the cable openings 34 has a non-circular cross-sectional shape (hexagonal in the illustrated embodiment) when viewed perpendicularly relative to the associated cable axis 32, although other shapes and combination of shapes may be provided. Because of these non-circular cross-sectional shapes, the distances between the cable axis 32 and different locations on an inner wall 36 of the opening 34 will vary. For example, in the illustrated embodiment, a relatively shorter distance 38 is defined between the cable axis 32 and a first location on the inner surface 36 of the opening 34, while a relatively longer distance 40 is defined between the cable axis 32 and a second location on the inner surface 36 of the opening 34. Compared to the cable 14, the shorter distance 38 is smaller than an outside radius of the cable 14 while the longer distance 40 is larger than the outside radius of the cable 14.

The illustrated electrical pass-through 10 includes a pair of cap assemblies, indicated generally as 42. Each of the cap assemblies 42 is adapted to engage an associated one of the electrical cables 14 to retain such electrical cables 14 in position relative to the housing 18 when the electrical pass-through 10 is assembled. Thus, preferably, the number of such cap assemblies 42 is the same as the number of electrical cables 14.

Figure 5:
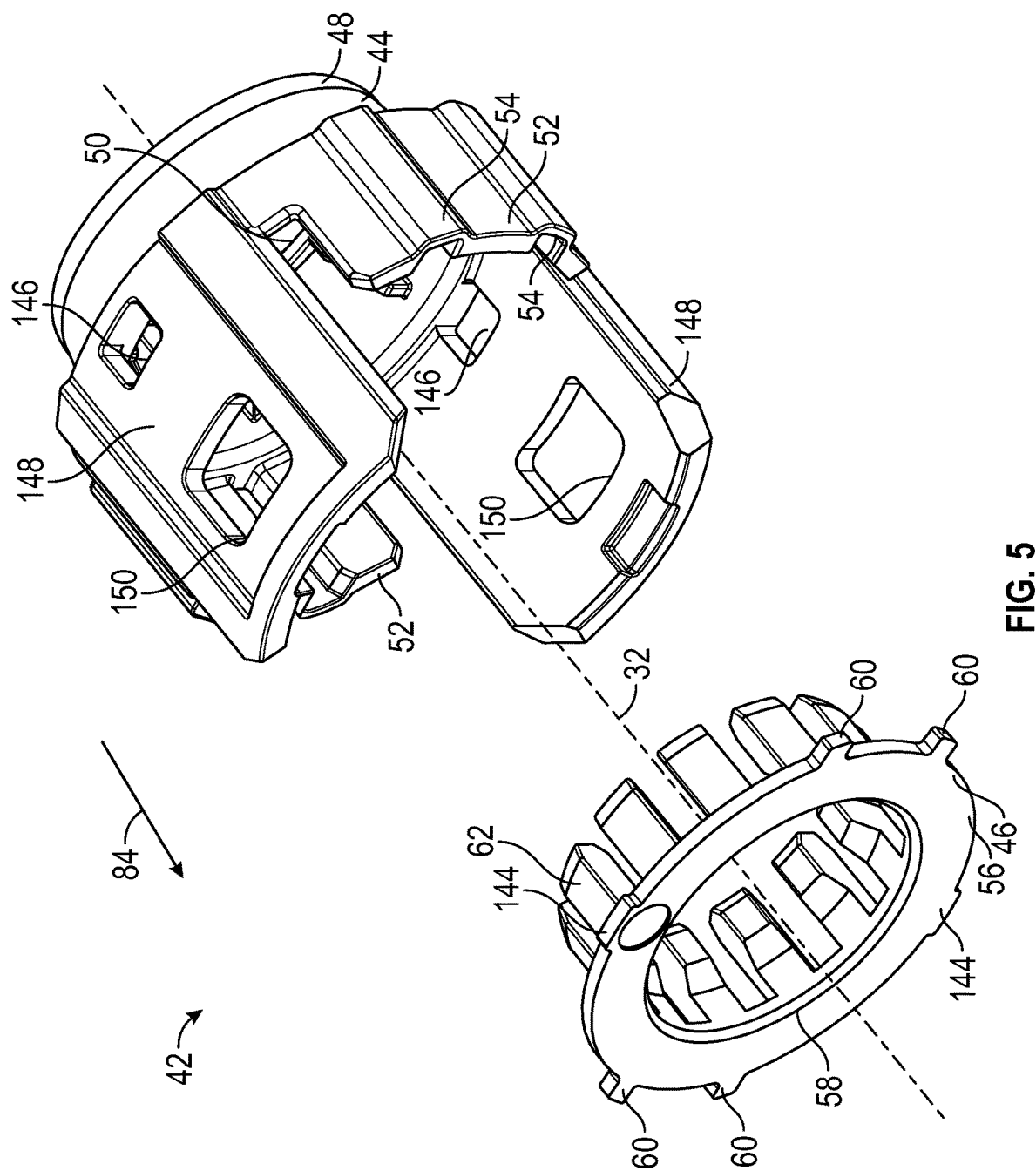
FIG. 5 is an enlarged exploded perspective view of a cap and a claw that cooperate to provide a cap assembly of the electrical pass-through illustrated in FIGS. 1 through 3.

FIG. 5 is an enlarged exploded perspective view of one of the cap assemblies 42 of the electrical pass-through 10. As shown therein, the illustrated cap assembly 42 includes a cap portion 44 and a claw portion 46. The illustrated cap portion 44 is molded from plastic but may be made from any desired material using any desired process. The cap portion 44 includes a cap body 48 that defines a cap opening 50, which allows the electrical cable 14 to pass therethrough. The cap portion 44 includes one or more cap guide supports 52 that extend from the cap body 48 toward the housing 18. The illustrated cap portion 44 includes two cap guide supports 52, but any desired number of cap guide supports 52 may be provided. Each of the illustrated cap guide supports 52 includes a pair of cap guides 54 that extend parallel to the cable axis 32. The illustrated cap portion 44 also includes two cap guides 54 that are provided on each of the cap guide supports 52, but any desired number of such cap guides 54 may be provided. The illustrated cap guides 54 are embodied as channels in the cap guide supports 52 that extend linearly and parallel to the cable axis 32, although such is not required.

The illustrated claw portion 46 is molded from a plastic material but may be made of any desired material using any desired process. The claw portion 46 includes a claw body 56 that defines a claw opening 58 that is adapted to allow the cable 14 to pass through the claw portion 46. The illustrated claw body 56 is generally annular in shape and is oriented co-axially about the cable axis 32, although such is not required. The illustrated claw portion 46 also includes one or more claw guides 60 that extend radially from the claw body 56 away from the cable axis 32. In the illustrated embodiment, the claw portion 46 includes four of such claw guides 60, but any desired number of such claw guides 60 may be provided. Lastly, the illustrated claw portion 46 also includes a plurality of resilient fingers 62 that extend from one side of the claw body 56.

In order to assemble the cap assembly 42, the cap portion 44 is initially positioned co-axially relative to the claw portion 46 such that the cap guide supports 52 provided on the cap portion 44 face toward the fingers 62 on the claw portion 46, as shown in FIG. 5. Then, the claw portion 46 and the cap portion 44 are moved toward one another such that the claw guides 60 provided on the claw portion 46 engage the cap guides 54 provided on the cap portion 44, thus providing the cap assembly 42. As a result, the claw guides 60 and the cap guides 54 cooperate to prevent relative rotational movement between the claw portion 46 and the cap portion 44.

Figure 6:
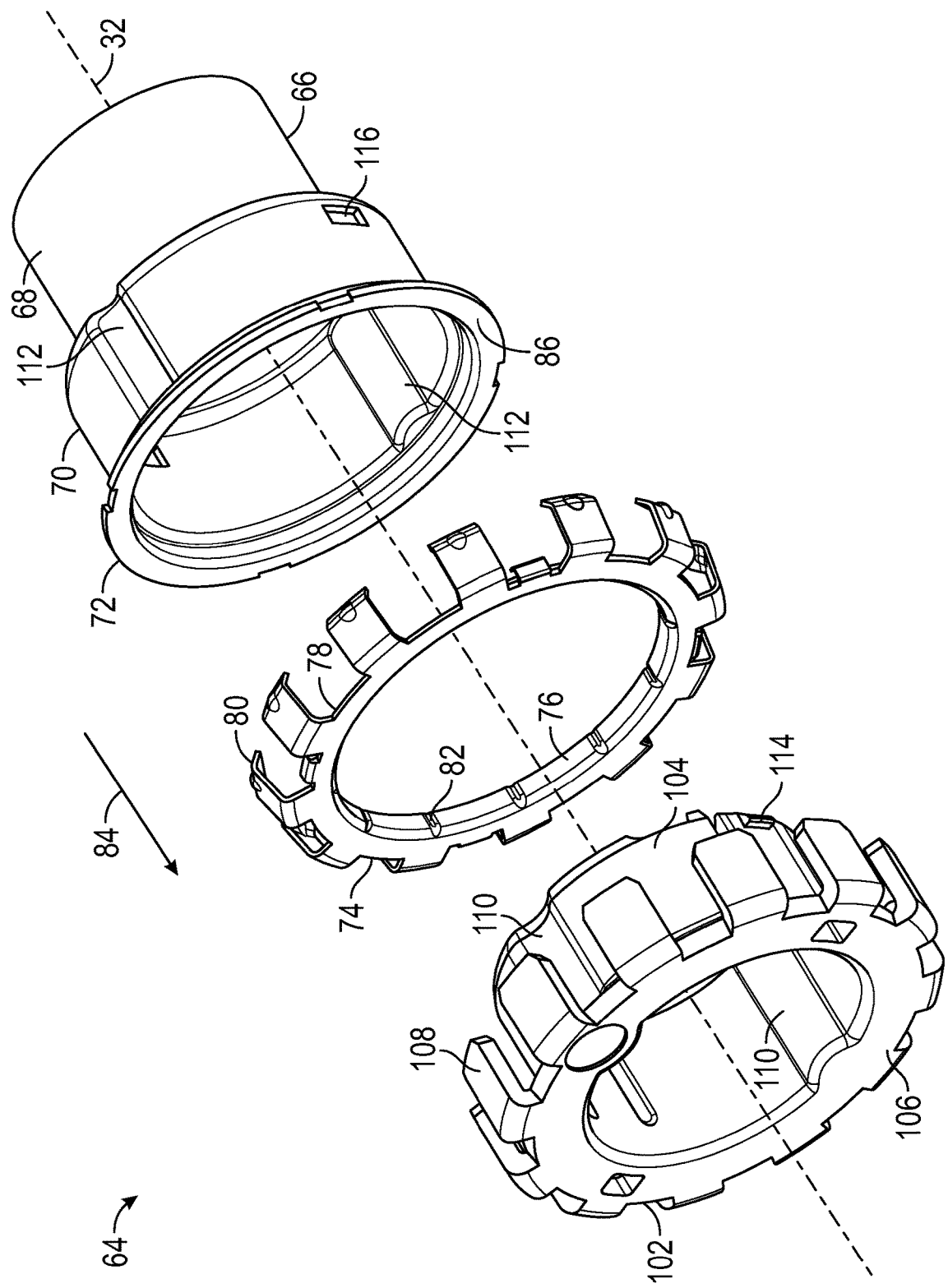
FIG. 6 is an enlarged exploded perspective view of a ferrule, a shield contact, and a retainer that cooperate to provide a contact assembly of the electrical pass-through illustrated in FIGS. 1 through 3.

Referring back to FIG. 3, the electrical pass-through 10 includes a contact assembly, indicated generally at 64. The contact assembly 64 is adapted to provide electrical contact between a shield 126 (shown in FIG. 13) of the cable 14 and the panel 12, as will be described below. The illustrated pass-through assembly 10 includes two contact assemblies 64 that are similar in structure and operation, but any desired number of such contact assemblies 64 having any desired structures or combination of structures may be provided. FIG. 6 illustrates one of these contact assemblies 64. As shown therein, the illustrated contact assembly 64 includes a ferrule 66. The ferrule 66 is stamped from sheet metal but may be made from any desired material using any desired process. The ferrule 66 includes a cable contact 68. The illustrated cable contact 68 is generally hollow and cylindrical shape and is adapted to extend about a portion of the cable 14. The ferrule 66 also includes a retainer sleeve 70 that extends axially from the cable contact 68. The illustrated retainer sleeve 70 is also generally hollow and cylindrical in shape and is larger in diameter than the cable contact 68, although neither is required. The ferrule 66 further includes a ferrule flange 72 that extends radially outwardly from the retainer sleeve 70.

Lastly, the contact assembly 64 includes a shield contact 74 that, in the illustrated embodiment, is stamped from sheet metal. However, the shield contact 74 may be made from any material and using any desired process. The illustrated shield contact 74 includes an axially-extending ring portion 76 that is generally hollow and cylindrical in shape and extends generally parallel to the cable axis 32. The shield contact 74 also includes a contact flange portion 78 that extends radially outwardly from the ring portion 76 and away from the cable axis 32. Additionally, the shield contact 74 includes one or more contact arms 80 that extend generally axially from the contact flange portion 78. The illustrated shield contact 74 includes twelve of such contact arms 80, but a greater or lesser number may be provided as desired. In the illustrated embodiment, a plurality of retaining features 82 is provided on an inner circumferential surface of the ring portion 76. The illustrated retaining features 82 are raised ridges that extend radially away from the cable axis 32. The illustrated shield contact 74 has twelve of such retaining features 82, but any desired number (having any desired structure or combination of structures) may be provided.

Figure 7:
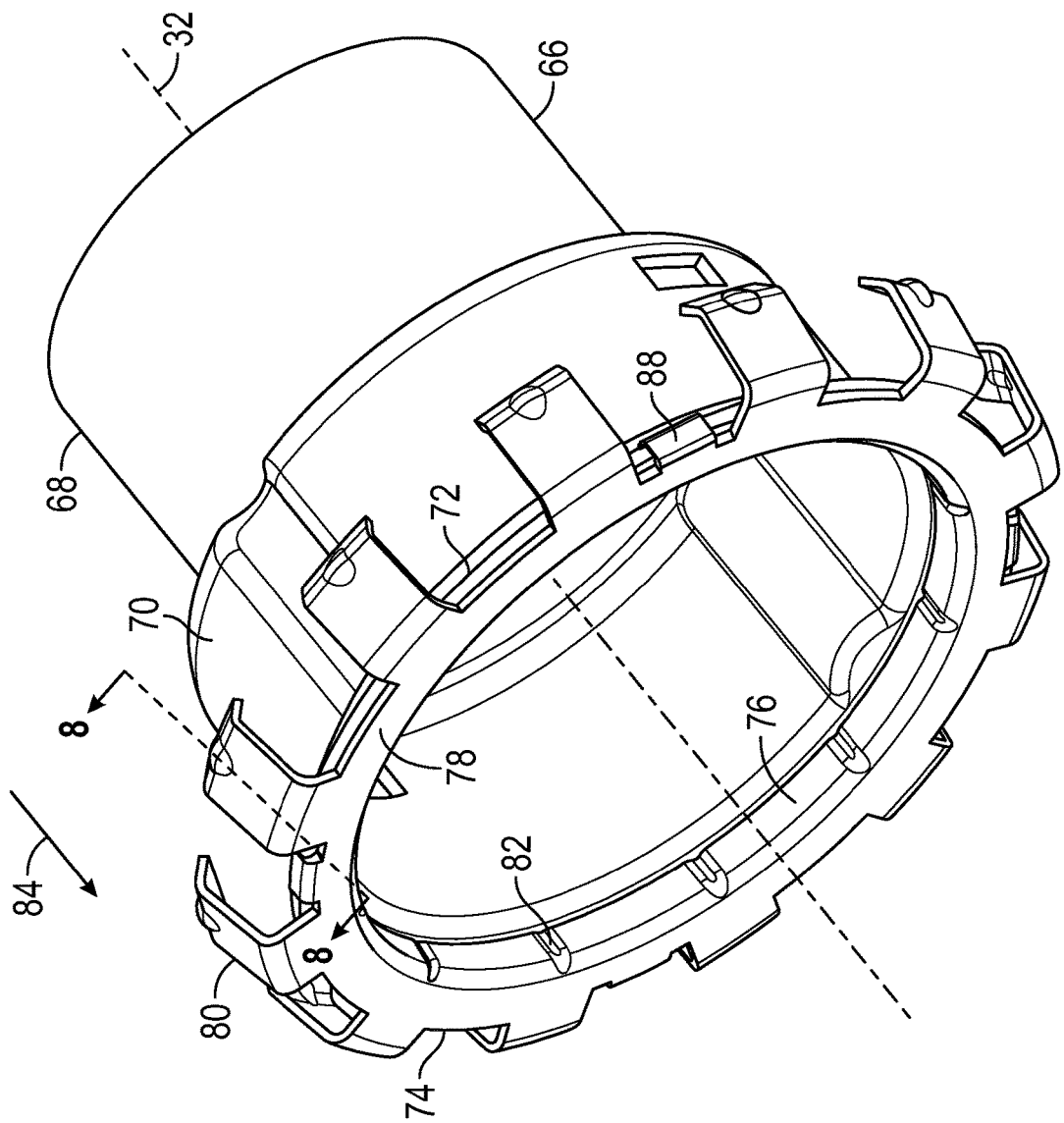
FIG. 7 is a further enlarged perspective view of the ferrule and the shield contact illustrated in FIG. 6 shown assembled.

Referring now to FIG. 7, there is illustrated a perspective view of the ferrule 66 after being attached to the shield contact 74. To connect the ferrule 66 to the shield contact 74, the ferrule flange 72 of the ferrule 66 is disposed axially adjacent to the contact arms 80 of the shield contact 74. As a result, the ring portion 76 of the shield contact 74 is axially aligned with the ferrule 66, and the contact flange portion 78 of the shield contact 74 is oriented axially away from the ferrule 66. The ferrule 66 is then moved relative to the shield contact 74 in an assembly direction 84 that is parallel to the cable axis 32 to engage the shield contact 74.

Figure 8:
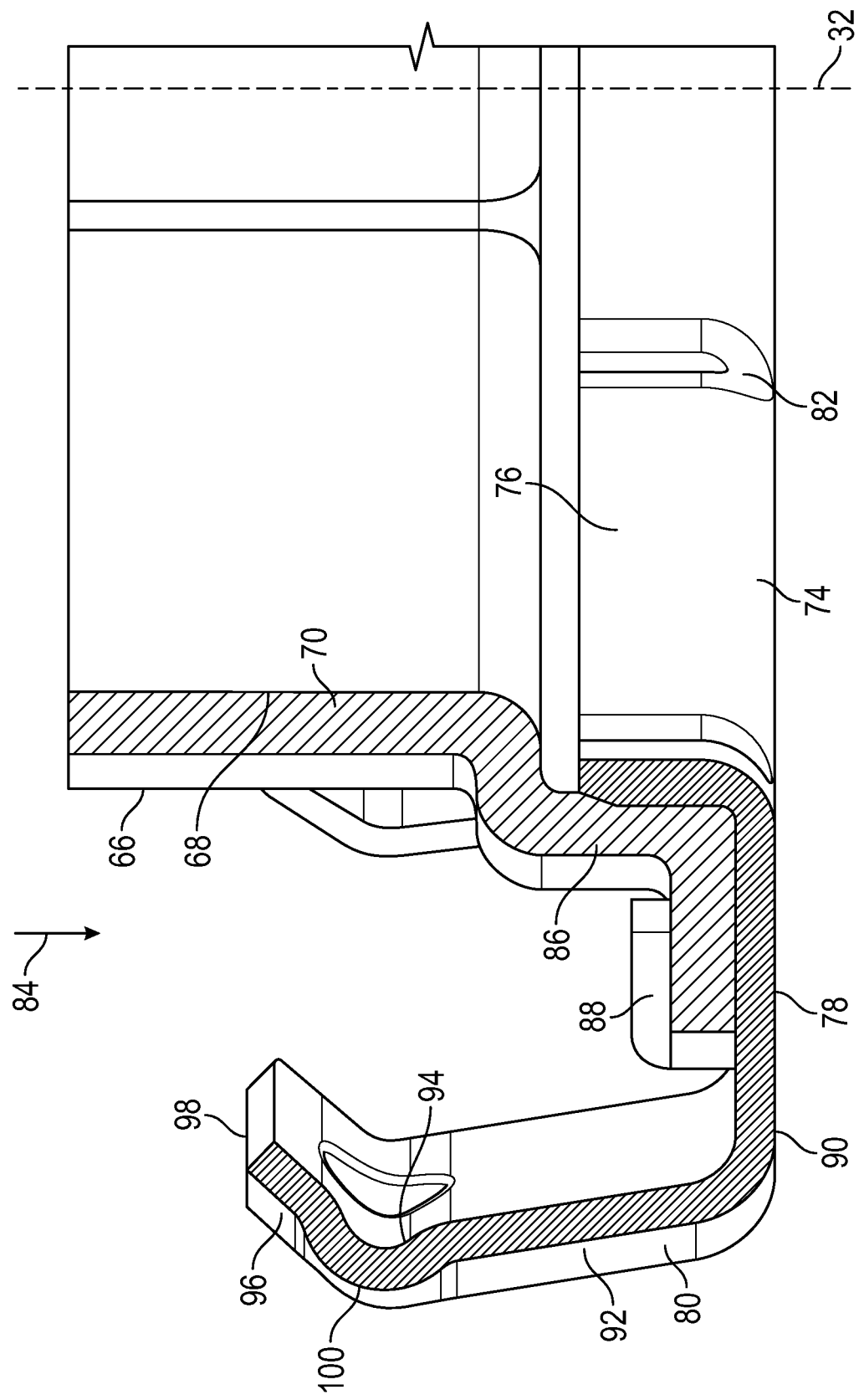
FIG. 8 is a further enlarged cross-sectional view of the assembly of the ferrule and the shield contact taken along line 8-8 of FIG. 7.

FIG. 8 is an enlarged cross-sectional view taken along line 8-8 of FIG. 7. As shown therein, the retainer sleeve 70 on the ferrule 66 includes a contact sleeve 86 at an outer end thereof. The contact sleeve 86 extends farther from the cable axis 32 than the rest of the retainer sleeve 70 does. The ring portion 76 of the shield contact 74 has an outer dimension that fits in an inner dimension of contact sleeve 86. The retaining features 82 on the ring portion 76 increase the size of ring portion 76 in order to provide a press fit engagement between the ferrule 66 and the shield contact 74. The ferrule 66 is moved in the assembly direction 84 so that the ferrule flange 72 engages the contact flange 78. The shield contact 74 also includes tabs 88 that extend from the contact flange portion 78 radially away from the cable axis 32. The illustrated shield contact 74 includes four of such tabs 88, but a greater or lesser number of tabs 88 may be provided. Each of the tabs 88 is folded over the ferrule flange 72 to capture the ferrule flange 72 between the tab 88 and part of the contact flange portion 78 to further retain the shield contact 74 in position relative to the ferrule 66.

As best shown in FIG. 8, each contact arm 80 includes an arm extension 90 that extends from the contact flange 78. Each contact arm 80 includes a first portion 92 that extends from the arm extension 90 in a direction that is substantially opposite the assembly direction 84, but not parallel to the cable axis 32. Rather, the first portion 92 is angled relative to the cable axis 32 such that the farther it extends from the arm extension 90, the farther it extends from the cable axis 32. Each contact arm 80 also includes an elbow portion 94, from which a second portion 96 extends from the first portion 92. The second portion 96 is angled relative to the cable axis 32 to an arm end 98. Lastly, the contact arm 80 includes a contact portion 100 that is located at the elbow portion 94. The illustrated contact portion 100 is an embossment that is provided on the contact arm 80 that extends away from the cable axis 32 and is adapted to engage the panel 12 (not shown in FIG. 8) as described below.

Referring back to FIG. 6, the contact assembly 64 includes a retainer 102. The illustrated retainer 102 is molded from plastic but may be formed from any desired material and by any desired process. The retainer 102 includes an annular retainer base 104 that is positioned around the cable axis 32 and extends axially. The retainer base 104 is adapted to fit inside the retainer sleeve 70 on the ferrule 66, as will be described below. The retainer 102 also includes a retainer flange 106 that extends radially away from the cable axis 32 from one end of the retainer base 104. The retainer 102 further includes retainer guards 108 that extend from the retainer flange 106. The illustrated retainer 102 includes twelve retainer guards 108, but any desired number of such retainer guards 108 may be provided. The illustrated retainer guards 108 generally extend parallel to the cable axis 32 opposite the assembly direction 84, although such is not required.

In order to attach the retainer 102 to the ferrule 66 and the shield contact 74, the assembly of the first ferrule 66 and the shield contact 74 is moved in the assembly direction 84 relative to the retainer 102 such that the retainer base 104 enters the retainer sleeve 70. The illustrated retainer 102 has two retainer guides 110 on the retainer base 104, although any desired number of such retainer guides 110 may be provided. Each of the illustrated retainer guides 110 is embodied as a channel within an outer surface of the retainer base 104 and extending generally parallel to the cable axis 32. The ferrule 66 includes a sleeve guide 112 on the retainer sleeve 70. The illustrated ferrule 66 includes two sleeve guides 112 but any desired number of such sleeve guides 112 may be provided. The illustrated sleeve guide 112 is embodied as a raised bump in an inner surface of the retainer sleeve 70 and extending generally parallel to the cable axis 32. The retainer guides 110 cooperate with the sleeve guides 112 to prevent the retainer base 104 from entering the retainer sleeve 70 when the retainer 102 is out of proper alignment with the ferrule 66.

Figure 9:
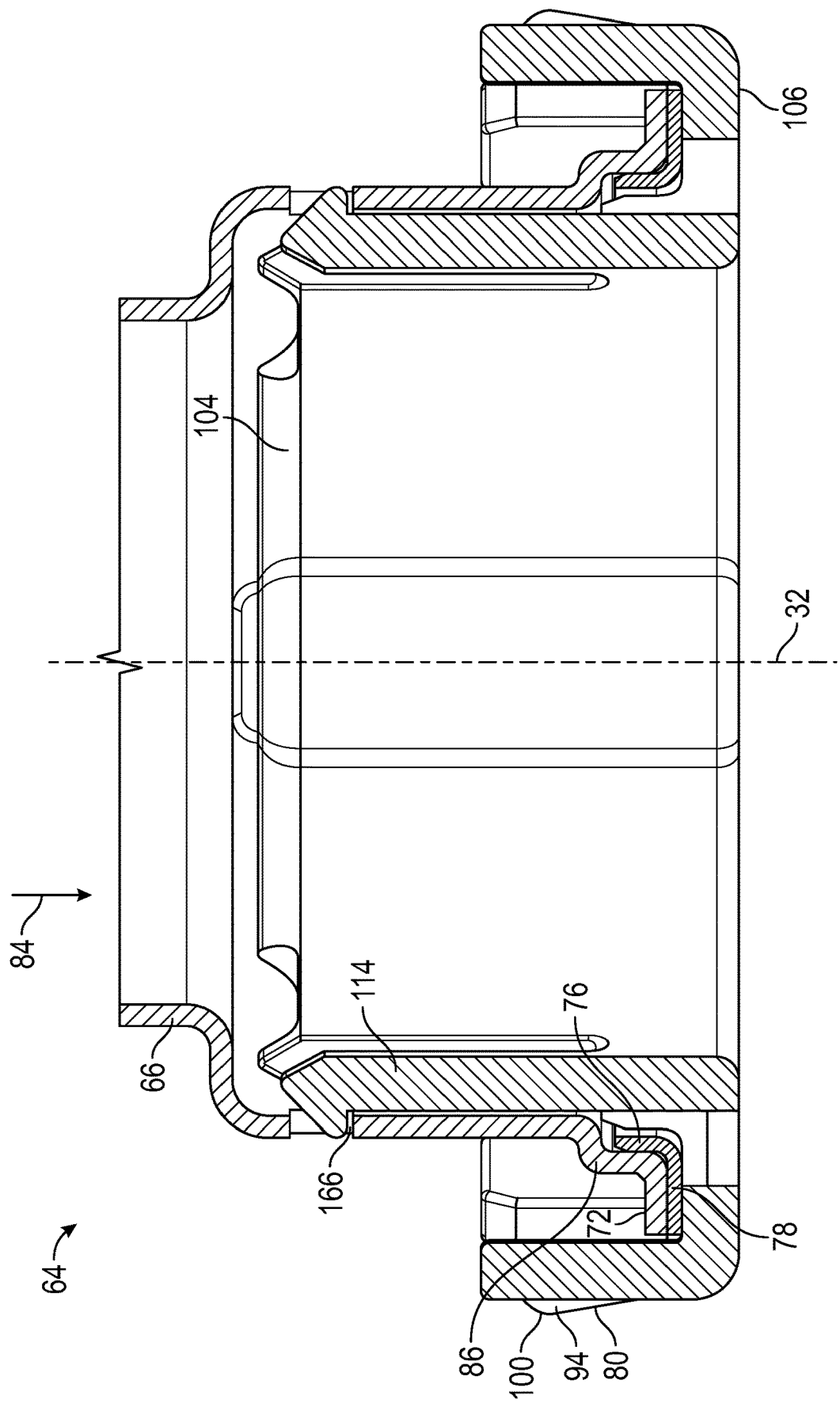
FIG. 9 is an enlarged cross-sectional view of the ferrule, the shield contact, and the retainer illustrated in FIG. 6 shown assembled.

Referring now to FIG. 9, there is illustrated a cross-sectional view of the assembled contact assembly taken along line 9-9 of FIG. 3. The retainer 102 includes retainer locks 114 that are adapted to maintain the retainer 102 in position relative to the inner ferrule 66. The illustrated retainer 102 includes two retainer locks 114, but any desired number of such retainer locks 114 may be provided. The illustrated retainer lock 114 is a resilient arm that extends parallel to the cable axis 32, although such is not required. The retainer lock 114 is located inside the retainer sleeve 70. Each retainer lock 114 engages a respective retainer catch 116 located on the retainer sleeve 70. The illustrated retainer catch 116 is a hole through the wall of the retainer sleeve 70.

When the retainer 102 is attached to the retainer sleeve 70, each of the retainer guards 108 is located between two adjacent contact arms 80. As shown in FIG. 9, only a portion of the contact arm 80 is farther from the cable axis 32 than the retainer guard 108. The retainer guards 108 extend farther from the cable axis 32 than the arm extension 90 and the arm end 98. The elbow portion 94 and the contact 100 are located farther from the cable axis 32 than the retainer guard 108. This allows the contact 100 to engage the panel 12 in the manner described below, while protecting the other parts of the contact arm 80 from damage.

Figure 10:
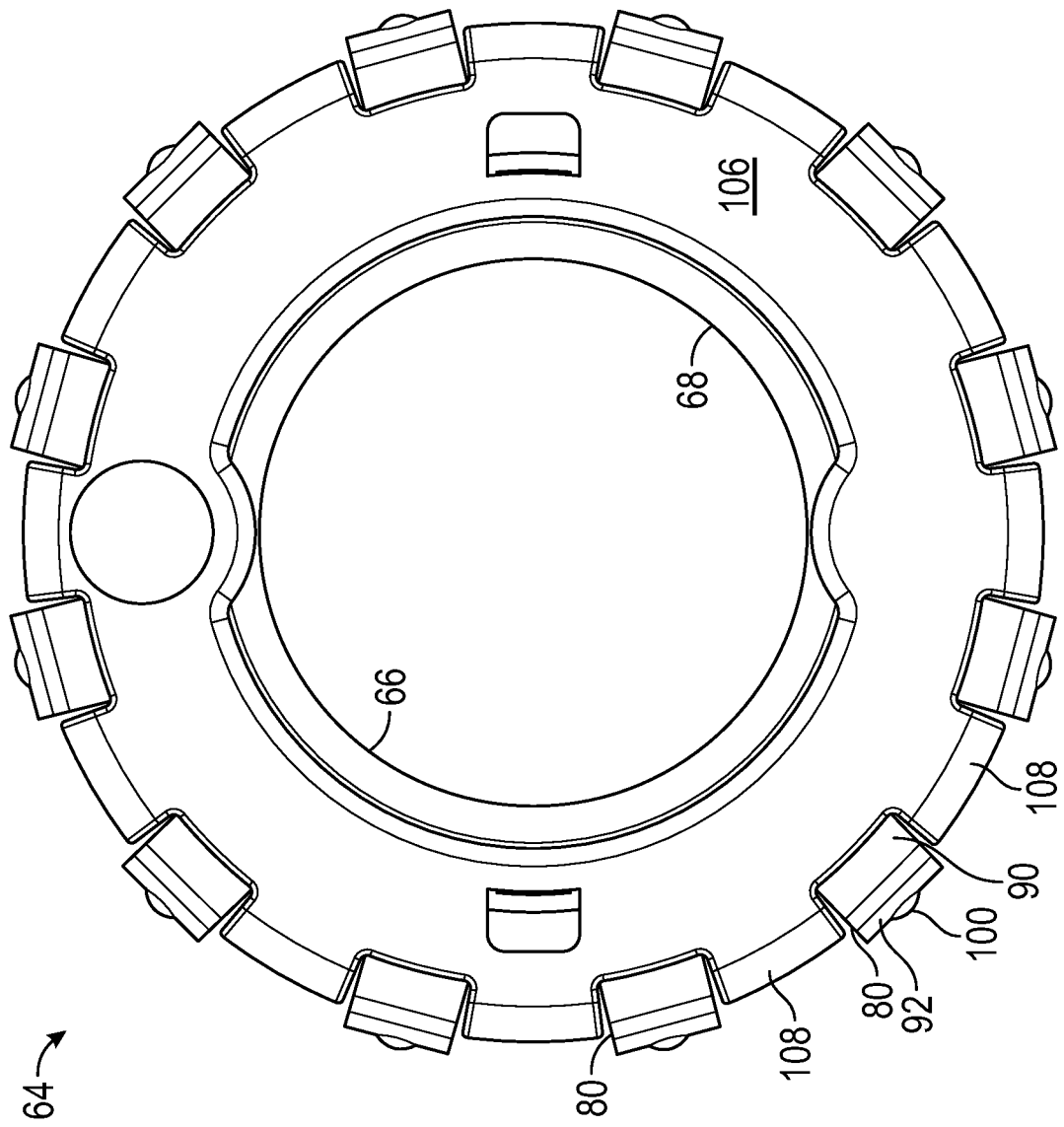
FIG. 10 is an end elevational view of the assembly of the ferrule, the shield contact, and the retainer illustrated in FIG. 9.

Referring now to FIG. 10, there is illustrated an elevational end view of the assembled contact assembly 64 taken along the cable axis 32. As shown therein, the cable contact 68 provides a surface for electrical contact on the inside of the contact assembly 64, and the contacts 100 provide locations for electrical contact on the outside of the contact assembly 64.

The manner in which the cables 14 are connected to the electrical pass-through 10 will now be described. The illustrated electrical pass-through 10 accommodates two cables 14, but only one will be described in detail. Initially, the cable 14 is axially aligned with the components of the electrical pass-through 10 as shown in FIG. 3. Then, the cable 14 is moved axially through those components. As shown in the upper right portion of FIG. 3, the cable 14 initially passes through the cap assembly 42 and a cable seal 118. The illustrated cable seal 118 is made of an elastomeric material, although such is not required. The cable 14 then passes through the cap support 22, the cable opening 34 (not shown in FIG. 3), the contact support 26, the contact assembly 64, a peripheral seal 120 and out of the housing 18. The illustrated peripheral seal 120 is made of an elastomeric material, although again such is not required. As previously described, the cable opening 34 has a non-circular cross-sectional shape, this allows the inner surface 36 of the cable opening 34 to engage the cable 14 to prevent rotation of the cable 14 relative to the housing 18.

Figure 11:
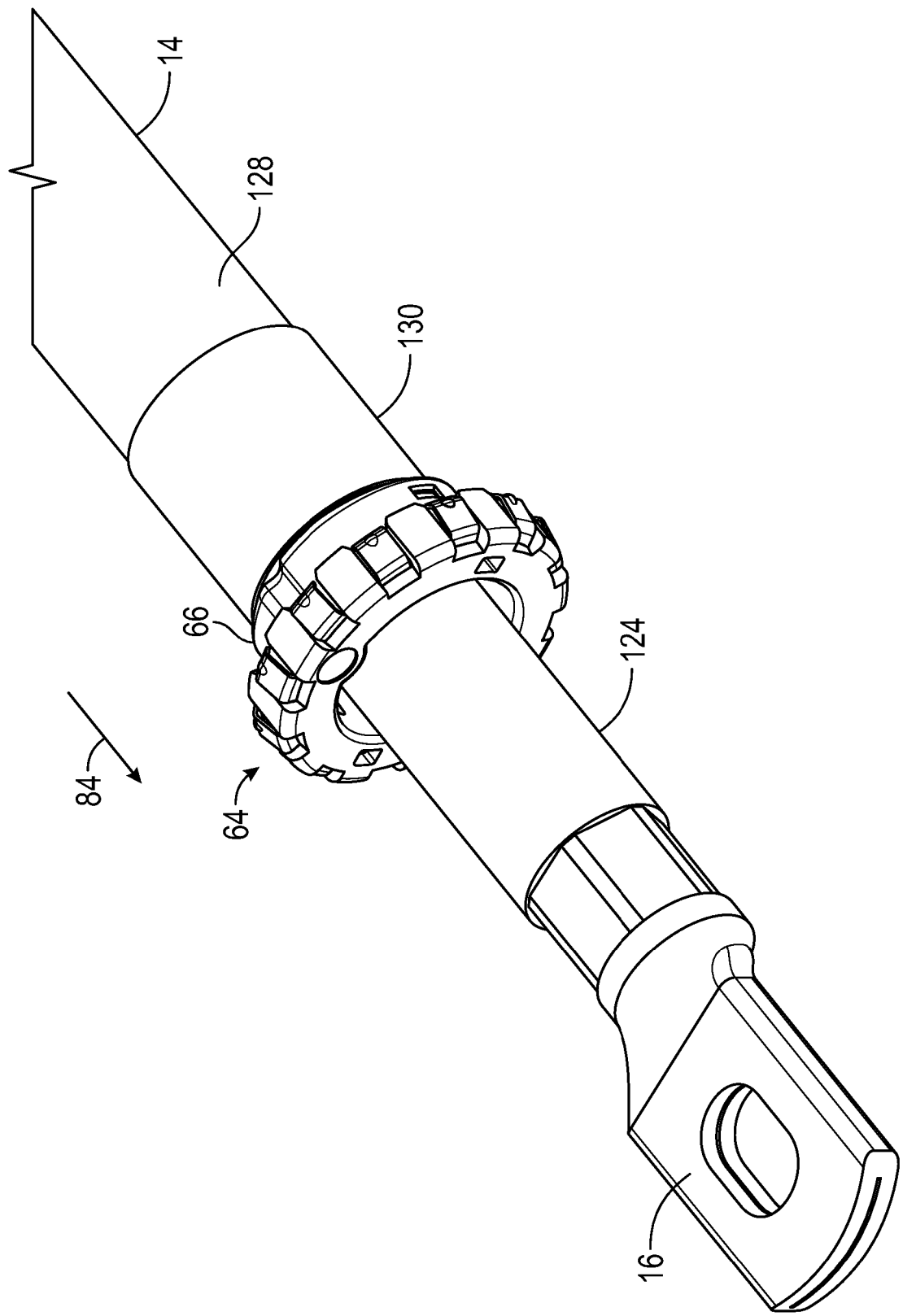
FIG. 11 is a perspective view showing the contact assembly supported on one of the cables illustrated in FIGS. 1 and 2.
Figure 13:
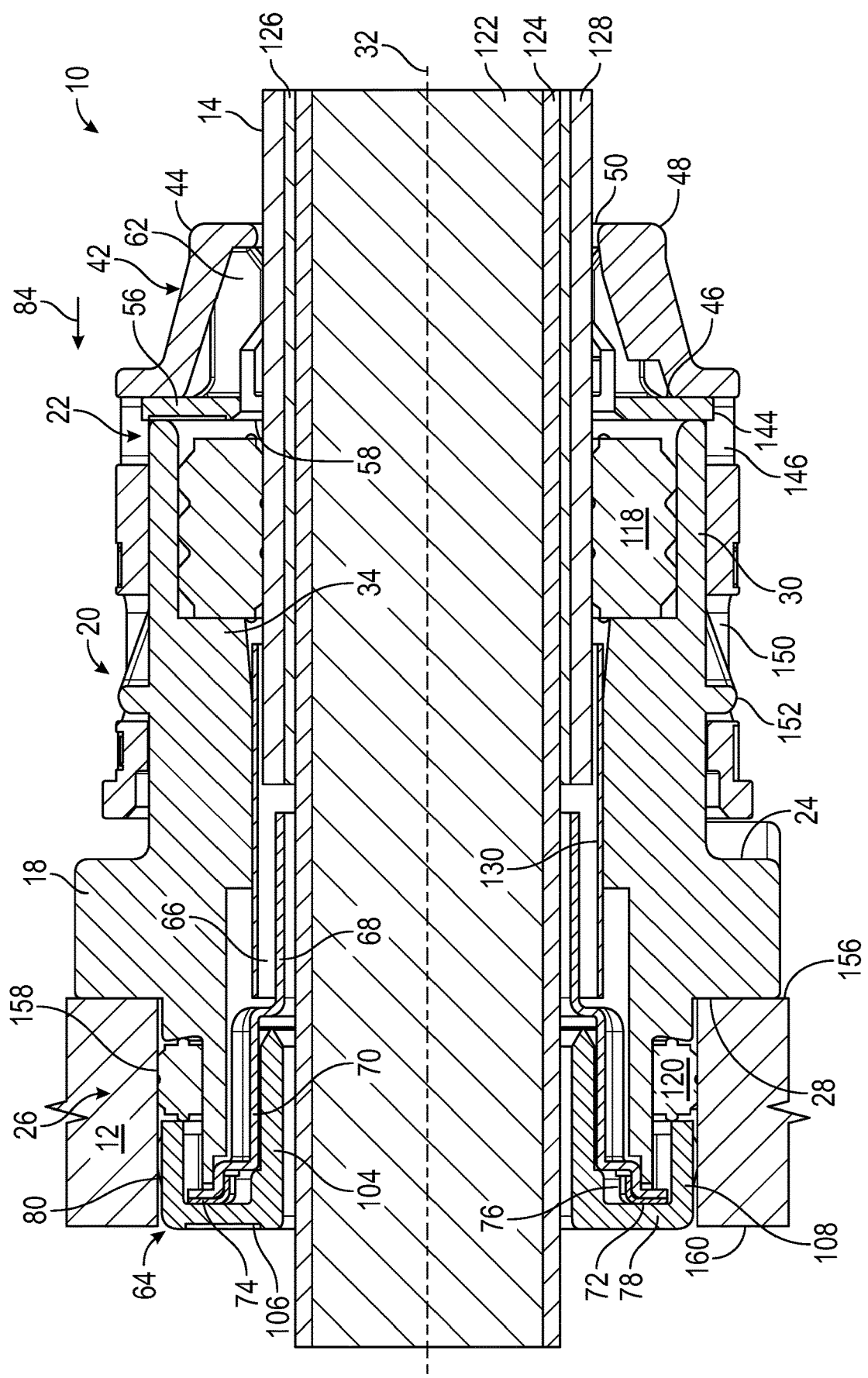
FIG. 13 is a cross-sectional view of the assembled electrical pass-through taken along line 13-13 of FIG. 1.

Referring to FIG. 11, there is illustrated a perspective view of the cable 14 attached to one of the contact assembly 64. The illustrated cable 14 is a co-axial shielded cable that, of itself, is well known in the art. Referring to FIG. 13, there is illustrated a cross-sectional view taken along line 13-13 of FIG. 1, and the parts of the cable 14 are shown therein. The cable 14 includes a conductor 122 that is surrounded by a first insulator 124. The first insulator 124 is surrounded by the conductive shield 126 and is surrounded by a second insulator 128. Portions of the cable 14 may be stripped in order to expose portions of the conductor 122 and portions of the shield 126.

Referring back to FIG. 11, the contact assembly 64 is shown attached to the cable 14 with the cable contact 68 (not visible in FIG. 11) engaged with the shield 126. A second ferrule 130 is crimped onto the cable 14 and the ferrule 66 in order to retain the contact assembly 64 in place on the cable 14 and to maintain contact between the cable contact 68 and the shield 126. Additionally, one of the terminals 16 is attached to the conductor 122 of the cable 14. The terminal 16 and the contact assembly 64 are fixed in place relative to the cable 14, although the cable 14 is still movable relative to the housing 18 (not shown in FIG. 13).

Referring back to FIG. 3, the illustrated contact support 26 is a cylindrical sleeve that extends from the second side 28 of the housing 18. The housing 18 includes a peripheral seal support 132 that may be a surface that is adapted to accommodate the peripheral seal 120. The peripheral seal support 132 is located on the outer side of the contact support 26, away from the cable axis 32. To assemble the electrical pass-through 10, the peripheral seal 120 is positioned on the peripheral seal support 132, and the contact assembly 64 is moved relative to the housing 18 so that part of the inner ferrule 66 is located inside the contact support 26.

Referring to FIG. 13, the contact assembly 64 is shown engaged with the contact support 26. The contact support 26 can be placed in this position by moving the housing 18 in the assembly direction 84 relative to the contact support 26 and the cable 14. The cable contact 68 on the ferrule 66 is located in the housing 18, while the retainer flange 106 and the retainer guards 108 are located outside the housing 18. The retainer guards 108 extend adjacent to the peripheral seal support 132, and the peripheral seal 120 is located between the housing 18 and the retainer guards 108. This prevents the peripheral seal 120 from moving off the peripheral seal support 132.

To continue assembly of the electrical pass-through 10, the cable seal 118 is disposed inside the shroud 30 of the cap support 22. The cable seal 118 is larger than the cable opening 34 and, thus, engages the housing 18 to prevent the cable seal 118 from moving farther in the assembly direction 84.

To attach the cap assembly 42 to the housing 18, the cap assembly 42 is moved in the assembly direction 84 relative to the housing 18 and the cable 14. As previously described, the cap assembly 42 includes the cap portion 44 and the claw portion 46. The cap assembly 42 is moved relative to the housing 18 until the claw portion 46 engages the housing 18, which prevents further movement of the claw portion 46 in the assembly direction 84 relative to the housing 18. However, the cap portion 44 can still be moved in the assembly direction 84 relative to the claw portion 46 and the housing 18.

Figure 12:
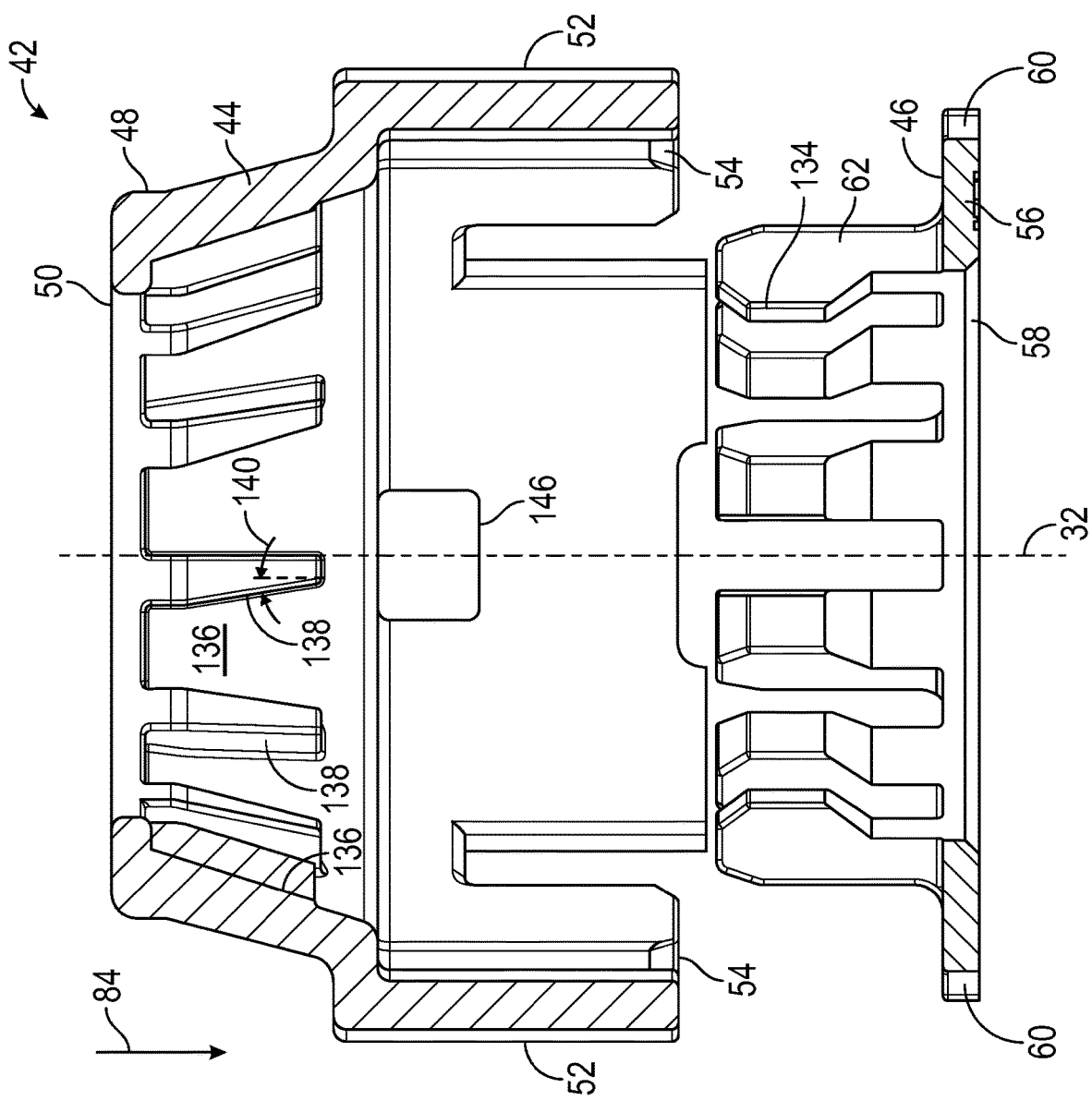
FIG. 12 is an exploded cross-sectional view of the cap assembly illustrated in FIG. 5.

Referring to FIG. 12, there is illustrated an exploded cross-sectional view of the cap assembly 42. As previously described, the cap opening 50 and the claw opening 58 accommodate the cable 14. However, the cable 14 is not shown in FIG. 12 so that features of the cap assembly 42 are visible. Each of the fingers 62 includes a cable contact surface 134 that is located on an inner side of the respective finger 62, facing the cable axis 32. When the cable 14 is moved through the cap assembly 42, the cable contact surfaces 134 face the cable 14, but are spaced apart from the cable 14 to allow the cap assembly 42 to be moved relative to the cable 14.

The cap portion 44 includes multiple lock surfaces 136 that are located near the end of the cap portion 44 opposite the assembly direction 84. The illustrated cap portion 44 includes twelve lock surfaces 136, one for each finger 62. The lock surfaces 136 are angled relative to the cable axis 32 such that as the distance from the claw base 56 increases, the distance between the lock surface 136 and the cable axis 32 decreases. When the cap portion 44 is moved in the assembly direction 84 relative to the claw portion 46, each of the fingers 62 engages one of the lock surfaces 136. The slope of the lock surface 136 causes the respective finger 62 to be pushed inwardly towards the cable axis 32. This causes the cable contact surface 134 to engage the cable 14 to hold the claw portion 46 in place relative to the cable 14.

The cap portion 44 also includes multiple twist surfaces 138 that are located adjacent to the lock surfaces 136. Each twist surface 138 extends generally perpendicular from the respective lock surface 136. The twist surfaces 138 are angled at a twist angle 140 relative to the cable axis 32. When the cap portion 44 is moved in the assembly direction 84 relative to the claw portion 46, each of the fingers 62 engages one of the twist surfaces 138, which causes the respective finger 62 to rotate about the cable axis 32. As previously described, the cap guides 54 engage the claw guides 60 to prevent the claw portion 46 from moving relative to the cap portion 44 other than in the direction parallel to the cable axis 32. As a result, the claw portion 46 does not rotate relative to the cap portion 44, and the fingers 62 are twisted relative to the claw base 56.

Referring back to FIG. 5, the claw portion 46 includes a claw lock 144 that extends radially from the claw base 56 away from the cable axis 32. The cap portion 44 includes a claw catch 146 that is located on a lock tab 148 that extends from the cap base 48 in the assembly direction 84. When the cap portion 44 is moved relative to the claw portion 46 in the assembly direction 84 to a lock position, the claw catch 146 engages the claw lock 144 to retain the claw portion 46 in position relative to the cap portion 44. The illustrated cap assembly 42 includes two lock tabs 148, two claw locks 144, and two claw catches 146, but may include any desired number of such components.

The lock tab 148 also includes a cap catch 150 that is located farther in the assembly direction 84 than the claw catch 146. Referring to FIG. 3, the housing 18 includes a cap lock 152 that is located on the outside of the shroud 30. When the cap portion 44 is moved relative to the housing 18 in the assembly direction 84 to the lock position, the cap catch 150 engages the cap lock 152 to retain the cap portion 44 in position relative to the housing 18. The illustrated pass-through assembly 10 includes two cap catches 150 and two cap locks 152, but may include any desired number of such components.

With the cap portion 44 in the lock position relative to the housing 18, the electrical pass-through 10 is in the assembled state. Referring back to FIG. 1, the housing 18 includes attachment points 154 that allow connectors, such as screws (not shown), to be used to attach the housing 18 to the panel 12. Referring to FIG. 13, the electrical pass-through 10 is shown attached to the panel 12. The housing 18 is located on a first panel side 156. The panel 12 includes a panel hole 158 that extends through to an opposite, second side 160 of the panel 12. The contact support 26 extends into the panel hole 158. The contact arms 80 on the shield contact 74 engage the panel 12. This provides an electrical connection between the panel 12 and the shield 126 on the cable 14.

The peripheral seal 120 is located in the panel hole 158 and is engaged with the panel 12 and the peripheral seal support 132. This provides a seal to prevent moisture from passing through the panel hole 158. Additionally, the cable seal 118 engages the cable 14 and the shroud 30. This provides a seal to prevent moisture from passing through the cable opening 34.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An electrical pass-through comprising:
a housing with a cap lock and a cable opening that extends through the housing and that defines a cable axis, the cable opening having a non-circular cross-sectional shape when viewed perpendicularly relative to the cable axis; and
a cap assembly with a cap catch, and a cap base with a cap opening that extends therethrough and that the cable axis extends through;
the cap assembly movable relative to the housing to a locked position wherein the cap catch engages the cap lock to retain the cap assembly in the locked position relative to the housing.

2. The electrical pass-through of claim 1, the cable opening having a polygonal cross-sectional shape when viewed perpendicularly relative to the cable axis.

3. The electrical pass-through of claim 1, the housing having an inner wall that defines the cable opening, wherein the distance between the cable axis and different locations on the inner wall vary.

4. A electrical pass-through comprising:
a housing with a cable opening that extends therethrough and defines a cable axis, the cable opening having a non-circular cross-sectional shape when viewed perpendicularly relative to the cable axis, the housing having a cap lock; and
a cap assembly including a cap portion and a claw portion;
the cap portion including a cap base with a cap opening that extends therethrough and that the cable axis extends through,
a cap catch, and
a plurality of lock surfaces that are angled relative to the cable axis such that as the distance from the claw portion increases, the distance between the lock surface and the cable axis decreases, and
the claw portion including a claw body with a claw opening that the cable axis extends through, and
fingers that extend from the claw body towards the cap portion;
the cap portion movable relative to the claw portion from an initial position wherein the cap portion is separate from the claw portion, to a locked position wherein each of the fingers engages one of the lock surfaces and is deflected toward the cable axis wherein the cap lock engages the cap catch to retain the cap portion in position relative to the housing.

5. The electrical pass-through of claim 4, the cap portion including a claw catch that engages a claw lock on the claw portion when the cap portion is in the locked position to retain the claw portion in the locked position relative to the cap portion.

6. The electrical pass-through of claim 4, the housing including a shroud that extends from the housing toward the cap assembly and is located around the cable axis.

7. The electrical pass-through of claim 6, wherein the cap lock is located on the shroud.

8. The electrical pass-through of claim 4, wherein the cap opening has a substantially circular cross-sectional shape when viewed perpendicularly relative to the cable axis.

9. The electrical pass-through of claim 8, wherein the claw opening has a substantially circular cross-sectional shape when viewed perpendicularly relative to the cable axis.

10. The electrical pass-through of claim 4, wherein the claw opening has a substantially circular cross-sectional shape when viewed perpendicularly relative to the cable axis.

11. An electrical pass-through comprising:
an electrical cable that defines a cable axis, the cable having an outer radius;
a housing with an inner wall that defines a cable opening that extends therethrough and that the cable axis extends through, the cable opening having a non-circular cross-sectional shape when viewed perpendicularly relative to the cable axis, the distance between the cable axis and different locations on the inner wall including a longer distance that is greater than the cable radius and a shorter distance that is less than the cable radius; and
a cap assembly including a cap portion and a claw portion;
the cap portion including a cap base with a cap opening that extends therethrough and that the cable axis extends through,
a cap catch, and
a plurality of lock surfaces that are angled relative to the cable axis such that as the distance from the claw portion increases, the distance between the lock surface and the cable axis decreases, and
the claw portion including a claw body with a claw opening that the cable axis extends through, and
fingers that extend from the claw body towards the cap portion;
the cap portion movable relative to the claw portion from an initial position wherein the cap portion is separate from the claw portion, to a locked position wherein each of the fingers engages one of the lock surfaces and is deflected toward the cable axis wherein a cap lock on the housing engages the cap catch to retain the cap portion in position relative to the housing.

* * * * *